United States Patent [19]

Tai et al.

[11] 3,975,305

[45] Aug. 17, 1976

[54] IONENE CONDUCTIVE POLYMERS AND RESULTING ELECTROGRAPHIC PRINTING BASES

[75] Inventors: Wun Ten Tai, Palos Hills; Kenneth G. Phillips, River Forest, both of Ill.

[73] Assignee: Nalco Chemical Company, Oak Brook, Ill.

[22] Filed: Oct. 6, 1975

[21] Appl. No.: 619,988

Related U.S. Application Data

[63] Continuation-in-part of Ser. No. 590,882, June 27, 1975.

[52] U.S. Cl. ................................ 252/500; 162/138; 204/2; 260/47 EP; 260/47 UA; 260/567.6 H; 427/121

[51] Int. Cl.$^2$ ...................... H01B 1/00; B32B 27/38

[58] Field of Search ......................... 162/138; 204/2; 252/500; 260/567.6; 427/121

[56] References Cited

UNITED STATES PATENTS

| | | | |
|---|---|---|---|
| 3,344,044 | 9/1967 | Gradsten et al. | 204/2 |
| 3,515,648 | 6/1970 | Chiu et al. | 204/2 |
| 3,823,034 | 7/1974 | Higaki | 204/2 X |
| 3,887,496 | 6/1975 | Cornier et al. | 252/500 |
| 3,924,050 | 12/1975 | Camp et al. | 427/121 X |

*Primary Examiner*—Leland A. Sebastian
*Attorney, Agent, or Firm*—John G. Premo; John S. Roberts

[57] ABSTRACT

Novel ionene polymers are formed by the Mannich reaction of an aromatic molcule having an electron withdrawing group with a lower aliphatic aldehyde and a lower aliphatic secondary amine followed by polymerizing the Manniched derivative by the use of chain extenders from the group of di-functional condensation monomers consisting of epihalohydrins and 1,4-dihalobutene-2. Additionally, the polymers may be prepared by substituting some or all of the secondary amines above with a primary amine and quaternizing the resultant polymers formed to increase the molecular weight of the product.

The products of this invention have utility as polymers useful for water clarification and as emulsion breakers for water-in-oil or oil-in-water emulsions.

These polymers and their quaternary salts have also a special utility here as an electroconductive coating which, when applied to paper specially as a substrate, produce an electroconductive surface adapted for electrographic printing.

In the group above specially preferred polymers are those prepared from tris(dialkylaminomethyl)phenol and a chain extender such as 1,4-dichlorobutene-2 (DCB) or epichlorohydrin and a bismethylchloride quaternary of tris(dialkylaminomethyl)phenol with the same chain extenders and their particular use as conductive resins or polymers. A preferred polymer in this group is from tris(dimethylaminomethyl)phenol. Obvious equivalents of bismethylchloride quaternaries are quaternaries prepared from other lower alkyl halides such as ethyl, propyl, and butyl where the carbon chain length is $C_1$–$C_6$.

12 Claims, No Drawings

IONENE CONDUCTIVE POLYMERS AND RESULTING ELECTROGRAPHIC PRINTING BASES

This application is a continuation in part of an application entitled "Ionenes" filed in the name of Wun Ten Tai on June 27, 1975, bearing Ser. No. 590,882.

INTRODUCTION

The present invention relates to the production of novel ionene resins or polymers having as a primary constituent an aromatic molecule wherein a positively charged active nitrogen site on a portion or portions of this molecule is produced by a Mannich type reaction using a secondary amine and an aldehyde or by condensation using a primary amine and an aldehyde. In general, the polymers may be produced from the following reactants: phenols, lower aliphatic aldehydes, lower aliphatic secondary amines, and chain extenders.

More specially the present invention is concerned with electroconductive polymers and their attachment to a substrate such as paper, resulting in an electrographic printing base. In this utility preferred members of the above ionene resins are those derived from tris(-dialkylaminomethyl)phenol and a chain extender such as 1,4-dichlorobutene-2 (DCB) or epichlorohydrin and a bismethylchloride quaternary of tris(dialkylaminomethyl)-phenol with the same chain extenders and their particular use as conductive resins or polymers. The preferred polymer in this group is from tris(-dimethylaminomethyl)phenol. Obvious equivalents of the bismethylchloride quaternary are quaternaries prepared from other lower alkyl halides such as ethyl, propyl, and butyl where the alkyl carbon chain length is $C_1$–$C_6$.

THE PHENOLS

The phenols or aromatic molecules utilized in this invention are substituted benzene rings having at least one electron withdrawing group attached. Examples of compounds of this nature include phenol, and ortho-, meta- and para-substituted alkyl phenols. For producing conductive polymers as in this invention, the phenols without alkyl substituents are preferred and are termed non-substituted phenol reactants. Where called for, the alkyl substituent may be any number of a variety of alkyl groups. Generally, the preference is those which are not overly bulky, and thus prefer to limit the substituents to 15 carbons or less. Additionally, the phenol-type material that may be used in this invention may be di- or tri-substituted by alkyl groups. When the phenol-type material is alkyl substituted, it is important that at least two remaining active positions be left on the molecule. It is thus important that at least two positions be left open, either at the ortho and/or para positions. It has been found that in the practice of this invention, when using tri-substituted alkyl phenol with only the meta positions remaining open (nonsubstituted), it is extremely difficult to achieve a reaction and obtain the ionene polymers.

Rather than using phenol or an alkyl substituted phenol, this invention will also perform satisfactorily with nitrates, cyanates, aldehydes or carboxylic acid functional groups in place of the hydroxyl group. In these cases the corresponding derivatives may also be substituted if desired with alkyl groups as described above.

The aldehydes preferred in the practice of this invention are those which contain from 1 to 3 carbon atoms. These lower aliphatic materials are reacted with a lower aliphatic secondary amine and this adduct is then reacted with the aromatic base molecule. Examples of preferred aldehydes include formaldehyde, acetaldehyde and propionaldehyde. Due to the commercial availability and reactivity of formaldehyde, this aldehyde is preferred.

The lower aliphatic secondary amines useful in the practice of this invention include those containing from 2 to 6 carbon atoms. Included in this group are dimethylamine, diethylamine, dipropylamine, methylethylamine, methylpropylamine, and ethylpropylamine. Again, due to commercial availability and cost, dimethylamine is preferred among secondary amines in the practice of this invention.

In addition to the molecules listed above, a lower aliphatic primary amine may be substituted for some or all of the secondary amines employed in order to increase the molecular weight of the product. If this is done, ideally the resultant molecule should later be quaternized with well-known materials such as methylchloride so as to improve the cationicity of the resultant product. The primary amines which may be used may contain from 1 to 4 carbon atoms with the most preferred primary amine being methylamine.

The chain extenders which are used in the course of this invention include but are not limited to 1,4-dihalobutene-2 and epihalohydrins. These compounds will react with the nitrogen group of the amine-aldehyde adduct after it is joined to the aromatic molecule and will join two moles of the Manniched aromatic molecule together for each mole of chain extender employed. Additionally, a lower aliphatic diamine, preferably ethylene diamine, may also be utilized in conjunction with the above chain extenders, with one mole of diamine being used to join two moles of chain extender. Thus, the lower aliphatic diamine may be used in quantities ranging from 0 up to 0.5 mole of diamine per mole of chain extender.

Suitable chain extenders include 1,4-dichlorobutene-2 (DCB) and epichlorohydrin. However, any halogen containing difunctional monomer which will undergo condensation polymerization will perform as a chain extender. Examples of these molecules include 1,3-dichloropropane and ethylenedichloride. When a diamine is used to further extend the chain length between substituted phenol groups, it is necessary to use two moles of the chain extender for each mole of the diamine employed. This enables a condensation polymer to be formed between the diamine, the chain extender, and the Mannich phenol derivative. The use of the diamine will also add additional amine functionality to the polymer which may or may not be quaternized if desired.

The first step in the preparation of the ionenes of the present invention is the reaction of a secondary amine, a lower aliphatic aldehyde, and a phenol or alkyl substituted phenol. This is accomplished by either adding the lower aliphatic aldehyde or the amine to the phenol followed by the amine or aldehyde, or in the alternative, reacting the lower aliphatic aldehyde with the secondary amine and adding this mixture to the phenol. This reaction proceeds by the well-known aromatic substitution rules and the "Mannich" derivative so formed will add to the phenol in accordance with these rules. (Confer Fieser and Fieser, Organic Chemistry, 3d Edition, Reinhold, 1964, pages 556–570.) This derivative is then joined together by the use of the chain extenders reacting with the tertiary nitrogen in the case of a secondary amine so as to join two moles of the Manniched phenol derivative together for each two moles of chain extender employed. Illustrative of this, but not limited to, is the following reaction scheme using as the reactants phenol, dimethylamine, formaldehyde, and 1,4-dichlorobutene-2 to form the ionenes of the present invention:

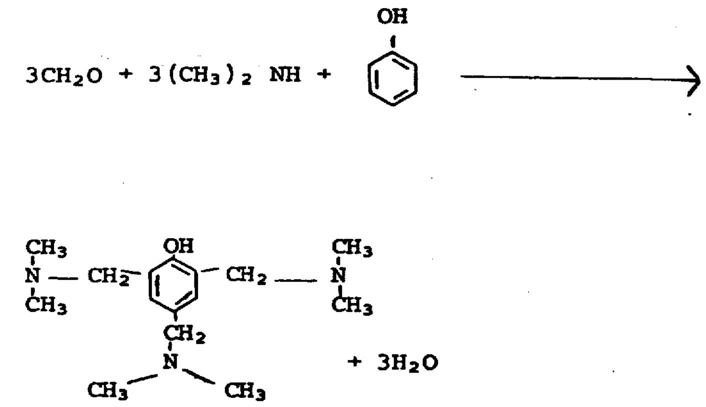

Tris(dimethylaminomethyl)phenol

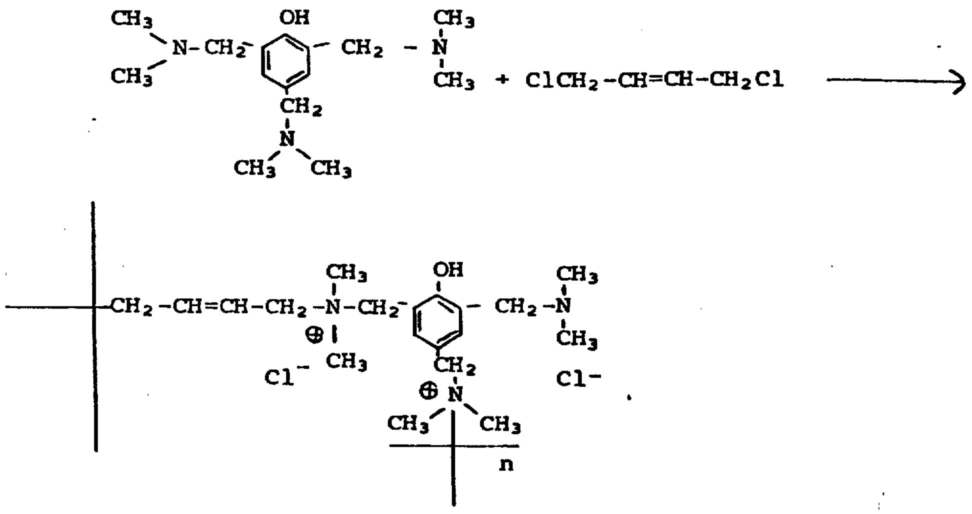

wherein *n* is a positive integer greater than about 5.

As seen from the formula, three moles of the secondary amine-aldehyde premix are necesary for a nonsubstituted phenol with only one mole of the chain extender necessary. The mole ratios of these reactants will differ depending on the substitution of the phenol derivative and the particular substituent employed. As an example, while the above reactants using a nonsubstituted phenol reacted in a mole ratio of 1:3:3:1, aromatic molecule to aldehyde to secondary amine to chain extender with a parasubstituted alkyl phenol, the respective mole ratios will be 1:2:2:1 due to the fact that the substituents will only attack on the ortho positions to the hydroxyl group. With a meta substituted alkyl phenol, again the reactants will be in a ratio of 1:3:3:1, since the ring will be substituted at both of the ortho positions as well as the para positions. With an ortho substituted alkyl phenol, the mole ratios of the necessary reactants will be 1:2:2:1, since the substituents will attack the remaining ortho as well as the para position.

As seen, molar ratios of lower aliphatic amine to the ratios of the lower aliphatic aldehyde preferably should be about 1.0, with the molar ratio of the phenol or alkyl substituted phenol and the chain extender also being about 1. It will also be seen that in order to form the ionene polymers of this invention, the molar ratios of $$\frac{(\text{amine} + \text{aldehyde})}{(\text{phenol} + \text{chain extender})} \quad \frac{A+B}{C+D}$$

must be at least 2.0.

With di- or tri-substituted alkyl phenols or with the use of other electron withdrawing groups replacing the hydroxyl, the addition of the premix will be done according to the aromatic substitution rules. (Confer Fieser and Fieser, Organic Chemistry, 3d Edition, Reinhold, 1964, pages 556–570.)

As stated above, the ionenes of this invention are prepared by reacting a lower aliphatic aldehyde, a secondary amine, and an aromatic molecule having substituted thereon an electron withdrawing group together and then reacting this with a chain extender. The aldehyde-secondary amine premixes which may be used in this invention are typically prepared by mixing together an aqueous solution containing an aldehyde with a secondary amine. This reaction may take place at ambient temperature, or may be performed at elevated temperatures; however, the reaction proceeds at a satisfactory rate at ambient temperature. The preferred secondary amine is dimethylamine and the preferred aldehyde is formaldehyde. The molar ratio of the aldehyde to the secondary amine may vary over a wide range, with the preferred mole ratio being in the range of 2:1 to 1:2. The most preferred molar ratio of amine to aldehyde is 1.2:1 to 1.1:1, which gives a 10-20% molar excess of amine and is preferred for the production of conductive polymers and electrographic printing coatings.

The premix should be made in as high a concentration as possible so as to avoid dilution of the end product during subsequent steps. Typically the adducts range from 0.1 to 55% by weight in solution.

Once the N,N-dialkylamino alkyl alcohol adduct is obtained, the phenol, phenol derivative, or other aromatic containing an electron withdrawing group to be employed is added to it in the specific mole ratios listed above and the reactants stirred at temperatures of from 10° to 100°C for a sufficient length of time to carry out the Mannich reaction. Oftentimes, the reaction will be complete within a relatively short period of time and it has been found that for most practical purposes within 5 hours this step of the reaction is complete.

In the alternative rather than using a premix, the secondary amine may be added directly to the phenol or substituted phenol compound followed by adding the lower aliphatic aldehyde to this mixture. This is done in the same mole ratios and under basically the same conditions as discussed above and produces an identical product to those products obtained using the premix.

At this point the product is heated to a temperature of from 20° to 70°C and the chain-extending compound is added slowly so as to maintain the temperature selected. The chain extender is added in a molar ratio equivalent to that of the starting aromatic base molecule employed. After a suitable length of time, the reaction is cooled, if desired, and the resultant ionene polymer is collected. Occasionally, it will be necessary to use a water-soluble organic solvent for solubility purposes. If this is necessary, the solvent used should be added in a quantity so as to regulate the solubility of the material and should be used sparingly so as to maintain a concentrated product. A solvent which has been found to be particularly useful in this step is isopropanol, although other water-soluble organic solvents which are unreactive will perform adequately.

Furthermore, it is sometimes necessary to place the organic water-miscible solvent in with the aromatic molecule for the Mannich reaction itself. This is due to the solubility of the aromatic base molecule employed so as to increase the ease of handling of this material and the elimination of a two-layered system for this step.

If during the Mannich reaction a diamine-type chain extender has been used with the preferred chain extenders, it will oftentimes be advantageous, although not necessary, to quaternize the resulting product. This can be done with any number of wellknown quaternization agents including methylchloride, ethylchloride, methylsulfate, and other commercially available wellknown materials. Those skilled in the art will readily see that the quaternization step will add cationicity to the resulting product and will enable it to perform more satisfactorily as a cationic polymer at alkaline pH values.

The polymers produced in accordance with this invention are characterized by their low intrinsic viscosity in the range of 0.05–0.7 and a preferred range of 0.08-0.19 and a low charge density having a maximum value of 3/20. The latter value is compared with a value for polymers of dimethylamine and epichlorohydrin of 1/7.

The products of this invention, in addition to their usefulness as conductive polymers and electroconductive layers suitable for attachment to a paper base and suitable for electrographic printing, are also useful for water clarification and emulsion breakers for water-in-oil or oil-in-water emulsions.

ELECTROCONDUCTIVE POLYMERS AND COATINGS

Certain members of the above-described family of polymers have exhibited unusually good electroconductive qualities when they are utilized on a paper or other suitable base or lend a utility for electrographic printing. This field of endeavor is known in the art and is illustrated by such patents as:

3,011,918 Silvernail et al (Dow)
3,640,766 Jursich et al (Nalco)

In particular, the products specially utilizable are copolymers from tris(dialkylaminomethyl)phenol and the quaternized derivatives of these compounds with lower alkyl halides. The dialkylamino substituents in the above are also lower alkyl where the alkyl carbon chain length is $C_1$–$C_6$. Illustrative of a specially preferred polymer suitable for electroconductive coating are the following:

(A)

Tris(dimethylaminomethyl)phenol-DCB Ionene Chloride

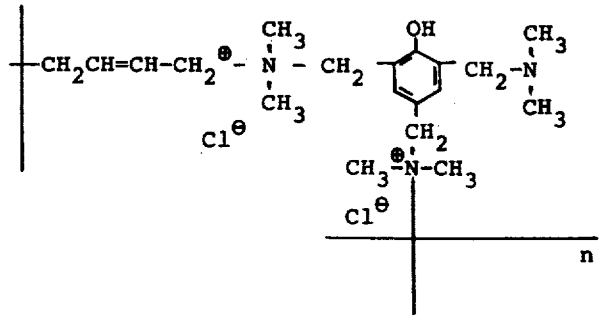

Tris(dimethylaminomethyl)phenol-Epichlorohydrin Ionene Chloride

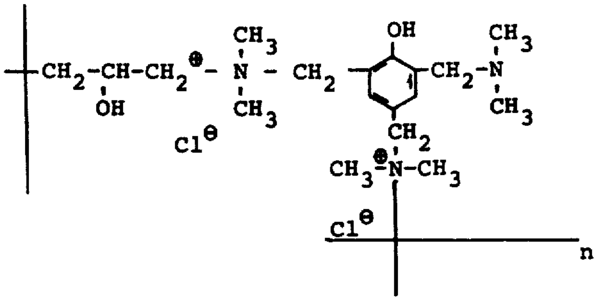

(B)

Ionene Chloride from DCB and bismethylchloride quaternary of tris(dimethylaminomethyl)phenol

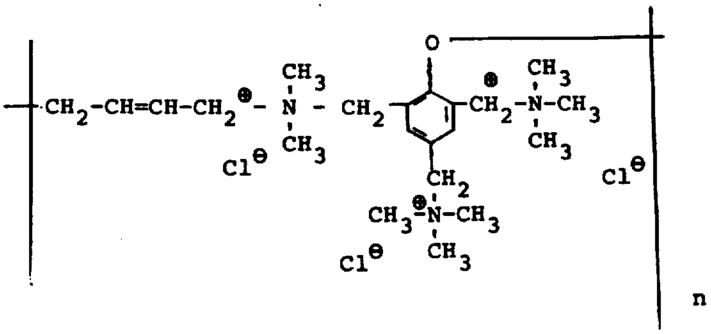

Ionene Chloride from epichlorohydrin and bismethylchloride quaternary of tris(dimethylaminomethyl)phenol

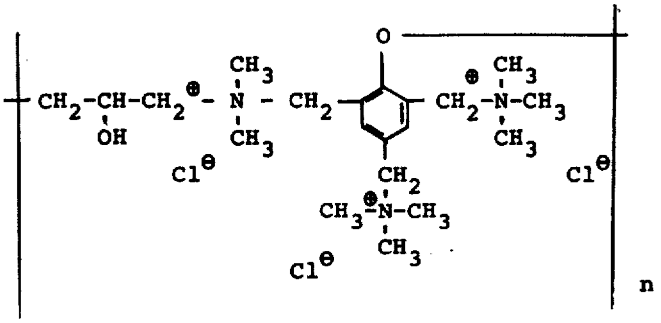

As depicted in the preceding section of this application, it is to be noted that there are important differences in the structures of the ionene polymers from tris(dimethylaminomethyl)phenol (A) and its dimethyl quaternary (B). The polymers from (A) are linked through two amine nitrogens by chain extenders and do not carry pendant quaternary amines.

The polymers from (B) are linked through phenolic oxygen and one amine nitrogen and carry two pendant quaternary amines.

It is generally believed today that cationic polymers with pendant quaternary amines are more active as conductive resins. The rationale given is that in order to be more conductive, polymers should retain more water. Pendant quaternary amines such as occur in (B) are believed to be more hygroscopic than the backbone quaternary amines because they are sterically more approachable.

Additionally, the ionene polymers from (B) do not have easily oxidizable phenolic oxygen or tertiary amine and therefore they are oxidatively more stable than ionenes from (A). The experimental results confirm this oxidative stability of ionenes from (B) as described in Example 2 and particularly in the intrinsix vicosity of the ionene set out there. Finally, the ionene products from (B) have been found to be more active than ionenes from (A) and this is believed due to the fact that ionenes from (B) carry two pendant quaternary amine groups per unit.

A specific formulation useful in the present invention is:

| | |
|---|---|
| Conductive polymer | 25% |
| Polyvinyl acetate | 25% |
| KCS clay | 50% |

Generally in the preparation of coated paper from the electroconductive polymer it is common to prepare a mixture or dispersion of the polymer and water and a pigment such as clay, together with filler such as a soluble pyrophosphate which may also act as a dispersing agent and to blend the mixture with an adhesive material to produce a composition useful for coating a wet paper web and to produce a finished paper of a high gloss and good finish. Among the requirements of an electroconductive coating for electrographic printing, it is necessary that the paper have a conductivity corresponding to a volume resistivity. An additional factor is the penetration achievement of the polymer in the paper. The penetration is largely governed by the intrinsic viscosity of the polymer--the higher the intrinsic viscosity, the lower the penetration of the polymer into the paper. It has been found that the intrinsic viscosity of the dimethylchloride quaternary with epichlorohydrin of tris(dimethylaminomethyl)phenol was 0.04 with satisfactory solvent holdout and showed a 20% penetration with ISOPAR G (high purity isoparaffinic materials--Exxon) and 30% penetration with toluene. Similarly, the dimethylchloride quaternary with 1,4-dichlorobutene-2 (DCB) exhibited an intrinsic viscosity of 0.1.

The coating is applied to the paper ordinarily in the form of an aqueous dispersion or emulsion and dried to form a conductive coating. The coating is applied to paper in the range of 0.5-2.5 pounds pickup per 3,000 square feet of paper and, as above described, may include clay, starch pigments, etc., as diluents and fillers. The coating may also be applied on a single or both major sides of the sheet of paper as required.

A paper is utilized which is preferably high wet strength and having a thickness of 3–6 miles. Other electrically conductive or semi-conductive bases may be used, such as, for example, plastic fibers, cloth, and metallic foil such as copper or aluminum. Also, as additives to the coating as photo conductors for use in the present invention are inorganic oxides such as the preferred zinc oxides or the oxides of antimonies, aluminum, bismuth, cadmium, mercury, molybdenum, and lead. Also, as an extender a preferred water-dispersible polymer which is utilized is polyvinylalcohol.

In the preparation of the conductive polymer by the Mannich reaction, it has been found that certain process parameters are advantageous. In the Mannich reaction of phenol to tris(dimethylaminomethyl)-phenol to encourage a higher molecular weight for the ionene product and better oxidative stability, excess dimethylamine is utilized to force the reaction to the right and achieve what is known as a complete Manniching of the phenol. In general, the use of a 10% excess of dimethylamine will increase the degree of substitution from about 2.4 units of dimethylaminomethyl group to 2.6 units on the aromatic ring. Utilization of 20% excess dimethylaminomethyl phenol showed an increase of degree of substitution to 2.8 units. Also, in the preparation it was advantageous to remove at the completion of the reaction unreacted dimethylamine, since it was found that in the absence of added caustic during the polymerization any unreacted dimethylamine is detrimental to the preparation of high molecular weight ionene resins.

It has been found in some cases that the utilization of 5-10% of ethylene diamine in addition to the use of either DCB or epichlorohydrin was effective in increasing the intrinsic viscosity of the polymers.

TABLE I

| | | | % Polymer | Intrinsic Viscosity | Brookfield Viscosity | % Penetration ISOPAR G | Toluene |
|---|---|---|---|---|---|---|---|
| Bismethylchloride quaternary of tris(dimethylamino-methyl)phenol | Epi | EDA (10% on amine) | 42.4 | 0.046 | 86 | 10 | 20 |
| 2,4,6-Tris(dimethyl-aminomethyl)phenol | DCB | | 30.6 | 0.098 | 210 | 20 | 30 |
| 2,4,6-Tris(dimethyl-aminomethyl)phenol | Epi | | 14.9 | 0.077 | 75 | 20 | 30 |
| 2,4,6-Tris(dimethyl-aminomethyl)phenol | Epi | | 39.5 | 0.049 | 654 | 20 | 30 |
| Poly(p-vinylbenzyl-N,N,N-trimethyl-ammonium chloride | | | | | | about 30 | 30 |

Epi = Epichlorohydrin
EDA = Ethylenediamine

EXAMPLE 1

Dimethylaminophenol

A reactor was heated to about 35°C in order to melt phenol and 6 moles was charged into the reactor with stirring. The heater was removed and dimethylamine was added (60% solution, 6 moles) with cooling over 5-minute period at temperatures below 35°C. 18 moles of paraformaldehyde was added with cooling the temperatures below 35°C. The first 6 moles were added slowly over about 20-minute period because of the high exotherm and the remainder of 12 moles were added rapidly in about a 15-minute period.

Additional dimethylamine (60% solution, 2.6 moles) was added while cooling also at temperature below 35°C over a time span of about 30 minutes and stirring was continued at ambient temperature for about one-half hour, while heating to reflux. The reflux heating was continued for about 3 hours with a temperature of about 88°C. The product was then stripped under reduced pressure (50 mm) to remove water and dimethylamine and cooled and discharged.

EXAMPLE 2

Evaluation of Conductive Properties

A polymer prepared from epichlorohydrin and the dimethyl chloride quaternary of tris(dimethylaminomethyl)phenol was evaluated for use as a conductive polymer. The conductive performance of the polymer was equivalent to that of poly(p-vinylbenzyl-N,N,N-trimethylammonium chloride) and the toluene and ISOPAR G holdout was excellent. Additionally, the testing showed that the new polymer did not color the coated paper and the thermal color stability of the coated paper was as follows: 60°C for 29 days or 100°C for 35 hrs., no color development yet. The molecular weight as indicated by intrinsic viscosity of the new experimental polymer was as follows: $\zeta_i = 0.04$.

EXAMPLE 3

Preparation of Bismethylchloride Quaternary of Tris(dimethylaminomethyl)phenol Polymer Tris(dimethylaminomethyl)phenol (1 mole) was quaternized with methylchloride (2 moles) at 40°C and at the natural pH (~10). At the end of the quaternization, the pH of the solution was about 5. The structure of this compound in polymer form is as follows:

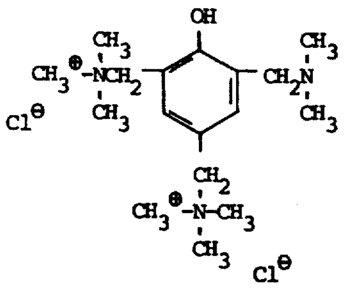

Bismethylchloride quaternary of tris(dimethylaminomethyl)phenol

This quaternary was polymerized using epichlorohydrin and a catalytic amount of sodium hydroxide under a nitrogen blanket or nitrogen atmosphere and the product was satisfactory in color. This reaction went better with epichlorohydrin than with DCB. In the latter, 2 moles of sodium hydroxide per mole of DCB were required and an unsatisfactory color resulted.

EXAMPLE 4

Tertiary Butyl Alkyl Phenol as a Starting Material 90.0 grams (2.0 moles) of dimethylamine gas was bubbled through a stirred aqueous formaldehyde solution (161.7 grams, .20 moles, 37.1%) at a temperature of from 10 to 30°C with external cooling over a period of 2.0 hours. 150.2 grams of p-t-butyl phenol (1.0 mole) was added and the mixture was stirred at 22 to 48°C for 2 hours followed by heating to reflux at 90°C for 4 hours. The resultant material had 2 layers which were separated. The oily layer weighing 214 grams was removed.

EXAMPLE 5

82.9 grams (.40 moles) of the oily layer of Example 4 was placed into a 500 milliliter resin flask without further drying and was heated to 45°. 50.0 grams of 1,4-dichlorobutene-2 (.40 moles) was then added slowly over a period of 30 minutes while maintaining temperature. The mixture was held at this temperature for an additional hour at which time the viscous product was removed from the flask. The polymer obtained exhibited an intrinsic viscosity of 0.13 and a Huggins constant of 0.94.

EXAMPLE 6

40.0 grams (.1515 moles) of the material produced in Example 4 was added to a 500 milliliter resin flask along with 60.0 grams of isopropanol alcohol. This mixture was stirred at room temperature, and 18.94 grams (.1515 moles) of 1,4-dichlorobutene-2 was added slowly over a period of 2 hours and 21 minutes at temperatures of from 21 to 47°C until the pH of the reaction mixture had decreased to approximately 7.0. The polymer produced by this method had an intrinsic viscosity of .07 and a Huggins constant of .91.

EXAMPLE 7

Dimethylamine gas (90 grams) was bubbled through a stirred aqueous formaldehyde solution containing 161.7 grams of a 37.1% formaldehyde solution. This mixture had added to it 220 grams (1.0 moles) of paranonylphenol. This mixture was heated at temperatures ranging from 22 to 95°C for six hours, at which time the oily layer was separated and the resulting bis(dimethylaminomethyl) p-nonylphenol was isolated. 35.8 grams of the Manniched nonylphenol above was then added to a 250 milliliter round bottom flask along with 50.0 grams of isopropanol alcohol. This mixture had added to it 13.3 grams (.1065 mole) of 1,4-dichlorobutene-2 and the reaction was allowed to continue with heating at temperatures of 45° to 51° for approximately two hours. The resulting polymer solution containing 41.98% polymer had an intrinsic viscosity of .062 and a Huggins constant of .47.

EXAMPLE 8-15

Unsubstituted Phenol Reactant

Various runs of polymer were made by the method as generally described. The mole ratios of reactants, reaction conditions and analytical results including intrinsic viscosity and percent cationicity at pH's 4 and 8 as determined by colloid titration are found in Table II. These polymers were tested for conductive properties and suitable for a paper base on electrographic printing.

Table II

Phenol-Formaldehyde-Dimethylamine-trans-1,4-Dichlorobutene-2 (Phenol-$CH_2O$-DMA-DCB)

| | | | | | Polymer Backbone without $Cl^-$ | | | | |
|---|---|---|---|---|---|---|---|---|---|
| | | | | | % + Charge | | | | |
| Ex. | | Initial (wt %) Reactant Conc. | T °C | T min. | pH 4 | pH 8 | $\eta_i$ | H | $\eta_i$ with $Cl^-$ |
| 8 | Phenol, $CH_2O$, DMA, DCB (1:3:3:1) | 68.8 | 33–59 | 65 | 102 | 81 | 0.108 | 0.68 | 0.089 |
| 9 | Phenol, $CH_2O$, DMA, DCB (1:3:3:1) | 22.0 | 22–34 | 67 | 104 | 72 | 0.086 | 0.73 | 0.071 |
| 10 | Phenol, $CH_2O$, DMA, DCB (1:3:3:1) | 23.4 | 50 | 10 | 108 | 89 | 0.077 | 1.4 | 0.063 |
| 11 | Phenol, $CH_2O$, DMA, DCB (1:3:3:1.4) EDA (0.2) | 42.3 | 25–30 | 34 | 102 | 75 | 0.075 | 1.4 | 0.058 |
| 12 | Phenol, $CH_2O$, DMA, DCB (1:3:3:1) | 65.0 | 45–50 | 93 | 108 | 91 | 0.28 | 1.6 | 0.23 |
| 13 | Phenol, $CH_2O$, DMA, DCB (1:3:3:1) | 36.3 | 75–37 | 180 | 111 | 85 | 0.21 | 2.2 | 0.17 |
| 14 | Phenol, $CH_2O$, DMA, DCB (1:3:3:1.1) | 18.6 | 45–55 | 208 | 130 | 119 | 0.17 | 1.5 | 0.14 |
| 15 | Phenol, $CH_2O$, DMA, DCB | 19.1 | 34–53 | 72 | 115 | 92 | 0.13 | 6.3 | 0.10 |

Table II-continued

| Phenol-Formaldehyde-Dimethylamine-trans-1,4-Dichlorobutene-2 (Phenol-$CH_2O$-DMA-DCB) | | | | | | | | |
|---|---|---|---|---|---|---|---|---|
| | | | | Polymer Backbone without $Cl^-$ | | | | |
| | Initial (wt %) | | | % + Charge | | | | |
| Ex. | Reactant Conc. | T °C | T min. | pH 4 | pH 8 | $\eta_i$ | H | $\eta_i$ with $Cl^-$ |
| (1:3:3:1.4) | | | | | | | particles in solution | |

$\eta_i$ = Intrinsic Viscosity
H = Huggins Constant
% + charge = % Cationic Charge as determined by colloid titration $CH_2O$ = Formaldehyde
DMA = Dimethylamine
DCB = 1,4-dichlorobutene-2
EDA = Ethylenediamine

I claim:

1. A conductive coating suitable for electrographic printing and present in a continuous surface in an amount corresponding to from 0.5 to 2.5 pounds per 3,000 square feet on a paper base, said coating comprising a water-dispersible copolymer of tris(dialkylaminomethyl)phenol and lower alkyl quaternary salt adduct thereof with a chain extender selected from a member of the group consisting of 1,4-dichlorobutene-2 and epichlorohydrin.

2. The coating according to claim 1 wherein ethylenediamine is added and utilized as an auxiliary chain extender.

3. The coating according to claim 1 wherein the lower alkyl quaternary salt adduct is formed from a trimethylammonium halide.

4. The coating according to claim 3 wherein the lower alkyl quaternary salt adduct is formed from trimethylammonium chloride.

5. A method of making a paper having a printing surface containing an electroconductive water-dispersible polymer, which method comprises contacting at least one of the major surfaces of the paper with an aqueous solution of a water-dispersible polymer selected from homopolymers of tris(dialkylaminomethyl)phenol and lower alkyl quaternary adducts thereof with a chain extender selected from a member of the group consisting of 1,4-dichlorobutene-2 and epichlorohydrin.

6. The method according to claim 5 wherein ethylenediamine is added and utilized as an auxiliary chain extender.

7. The method according to claim 5 wherein the lower alkyl quaternary salt adduct is formed from a trimethylammonium halide.

8. The method according to claim 7 wherein the lower alkyl quaternary salt adduct is formed from trimethylammonium chloride.

9. A water-dispersible ionene chloride copolymer of a lower alkyl quaternary salt adduct of tris(dialkylaminomethyl)-phenol and epihalohydrin.

10. The copolymer of claim 9 wherein the epihalohydrin is epichlorohydrin.

11. A water-dispersible ionene chloride copolymer of a lower alkyl quaternary salt adduct of tris(dialkylaminomethyl)-phenol and 1,4-dihalobutene-2.

12. The copolymer of claim 11 wherein the 1,4-dihalobutene-2 is 1,4-dichlorobutene-2.

* * * * *